United States Patent
Parker, Jr. et al.

(10) Patent No.: US 6,717,511 B2
(45) Date of Patent: Apr. 6, 2004

(54) VEHICLE ALARM AND THEFT DETERRENT SYSTEM

(75) Inventors: Donald Michael Parker, Jr., Yorba Linda, CA (US); Eunice Inez Parker, Yorba Linda, CA (US)

(73) Assignee: Dial-A-Theft, Inc., Yorba Linda, CA (US)

( * ) Notice: Subject to any disclaimer, the term of this patent is extended or adjusted under 35 U.S.C. 154(b) by 382 days.

(21) Appl. No.: 09/879,786

(22) Filed: Jun. 12, 2001

(65) Prior Publication Data

US 2002/0196132 A1 Dec. 26, 2002

(51) Int. Cl.[7] .............................................. B60R 25/10
(52) U.S. Cl. ..................... 340/426; 340/425.5; 340/7.2; 379/58; 379/59; 307/10.3
(58) Field of Search .............................. 340/426, 425.2, 340/539, 825.72, 825.69, 7.2; 379/37, 39, 58, 59; 307/10.1, 10.2, 10.3

(56) References Cited

U.S. PATENT DOCUMENTS

| 5,225,713 A | * | 7/1993 | Henneberry et al. | ....... 307/10.2 |
|---|---|---|---|---|
| 5,448,218 A | * | 9/1995 | Espinosa | ..................... 340/426 |
| 5,513,244 A | * | 4/1996 | Joao et al. | .................. 455/404 |
| 5,652,564 A | * | 7/1997 | Winbush | ..................... 340/426 |
| 5,805,057 A | * | 9/1998 | Eslaminovin | ............... 340/426 |
| 5,812,051 A | * | 9/1998 | Talbot et al. | ............... 340/426 |
| 6,323,762 B1 | * | 11/2001 | Ekpo, Jr. | ..................... 340/426 |

FOREIGN PATENT DOCUMENTS

JP      2002166823 A   * 11/2001

* cited by examiner

Primary Examiner—Daniel J. Wu
Assistant Examiner—Son Tang
(74) Attorney, Agent, or Firm—Clement Cheng

(57) ABSTRACT

This is a system for preventing vehicle theft that can be activated and deactivated from a touch-tone phone. The alarm activation code and alarm deactivation code are capable of activating a plurality of switches through the feedback loop. When the car is stolen, the owner can activate the signal code, which will disable the engine once the thief turns off the engine. After the stolen car is restored, the owner can deactivate the engine-disabling code and drive the car as usual.

8 Claims, 2 Drawing Sheets

VEHICLE ALARM AND THEFT DETERRENT SYSTEM

BACKGROUND

DESCRIPTION OF THE RELATED ART

Vehicle theft is a worldwide problem. An automobile can require an investment of a year of personal income. Cars are particularly important in automobile reliant cities such as Los Angeles. When a person's car is stolen, the car owner can also suffer a host of negative psychological injuries ranging from anxiety, depression, heart attacks and panic attacks. A well-designed automobile anti-theft device can deter car thefts and aid in vehicle recovery.

Traditional car alarms activate a siren or horn when an intruder opens a car door or breaks a window while the alarm is armed. These alarms have become less of a theft deterrent because the frequency of false alarms has conditioned people to ignore them. Car thieves have learned to disable traditional alarms allowing them to steal the car. This has lead to an ever increasing panoply of devices to foil car theft.

Many anti theft devices deactivate the engine. The Winbush Bold Thief Security System (U.S. Pat. No. 5,652,564) disables a stolen car by means of a disabling signal that can be sent from a pager, wristwatch, or cell phone. Chen's Robbery-Repelling Alarm System (U.S. Pat. No. 4,646,343) also gives the car a voice. Chen's device includes a taped message that shouts "Help"; or "We have been robbed"; or "arrest the burglar, please" while the ignition coil is deactivated and a phone call is made with a prerecorded message to the proper authorities. Tompkins created a Beeper Controlled Auto Security System (U.S. Pat. No. 5,600,299). The Tompkins alarm system terminates the car's ignition through a radio or paging signal. It also includes silent homing signal to be received by the police or car owner. The homing signal sounds louder as the stolen car draws closer to the receiver. The Weinblatt Anti-Theft Automobile Security System (U.S. Pat. No. 5,635,901) requires a two-step disabling process. Should a driver find himself being carjacked, he activates a first switch. Unfortunately, reaching for a hidden switch at gunpoint can be dangerous. After the owner is forced out of the car, the hijacker has to enter a code to keep the engine running.

Many car alarms page a person to give notice of a theft. Xiao created the Car Alarm Transmitting and Paging system (U.S. Pat. No. 6,028,506). The Xiao system includes a normal pager that receives notification of car theft. When the car is stolen, the car sends an alarm to the pager. The Byrd Wide Area Wireless System (U.S. Pat. No. 6,049,269) allows a communications link to any one of a fleet of cars to determine the car's identity and location. Dudley created the Vehicle Alarm System Triggerable Cell Phone Activation Circuit (U.S. Pat. No. 6,009,320). A cell phone integrated with the car's circuit notifies the owner of the car theft. The cell phone in the car can dial multiple selected numbers to give notice of theft.

Suda created a Pager Vehicle Communication Apparatus (U.S. Pat. No. 5,990,785). The Suda device remotely controls engine starting and stopping, door lock and unlock operations, and other vehicle accessories. The micro controller receives commands from a telephone or pager and sends them to the stored control program. Notably, the CPU can check an RPM meter to allow activation of certain functions only when the car is at a low RPM, such as idle. Unfortunately, engine deactivation may still occur in dangerous situations such as if the vehicle stalls while climbing a hill or if the car is shifted into neutral.

Thus, a car theft deterrent device is desired that is inexpensive to install, can disable the engine safely, is difficult to disable, and does not give false alarms. It would also be desired that the device give notice of a car theft. These features should not hinder the towing of the car should it be necessary to do so.

LIST OF REFERENCES CITED

| Inventor | Invention | U.S. Pat. No. |
|---|---|---|
| Tompkins | Beeper Controlled auto security system | 5600299 |
| Winbush | Bold thief security system | 5652564 |
| Suda | Pager Vehicle Communication Apparatus | 5990785 |
| Weinblatt | Anti-theft automobile security system | 5635901 |
| Xiao | Car Alarm Transmitting and Paging system | 6028506 |
| Chen | Robbery-repelling alarm System | 4646343 |
| Dudley | Vehicle Alarm System Triggerable Cell Phone Activation Circuit | 6009320 |
| Byrd | Wide Area Wireless System for . . . | 6049269 |

DESCRIPTION OF THE PREFERRED EMBODIMENT

Theft Notification

The Parker system can operate without an automatic notification means. A car owner usually learns of a theft upon return to the parking lot to see that the car is missing. After determining that the car was not towed by parking enforcement, the owner realizes that the car has been stolen.

The Parker system can operate with a notification means also. When a car is started, an ignition sensor sends a signal to the CPU, which in turn gives the owner notification. The notification means can be a cellular phone that sends a page to the owner. The owner can receive the page via a pager or cell phone. Alternatively, the owner can carry a fob, or a short-range radio receiver capable of receiving signals from a radio transmitter in the car.

Many car owners are the only drivers of their vehicle. Thus, notification of ignition is often the only notice necessary. Optionally upon ignition, a camera on the dashboard can take a photo of the driver and send the digital image to an embedded cell phone located on the car for storage. The Parker device can receive pager signals or a cellular or any other radio signals. The embedded cell phone then sends the digital image of the driver to the owner's cell phone. A digital photo can be fun for gadget lovers.

Figure 1:
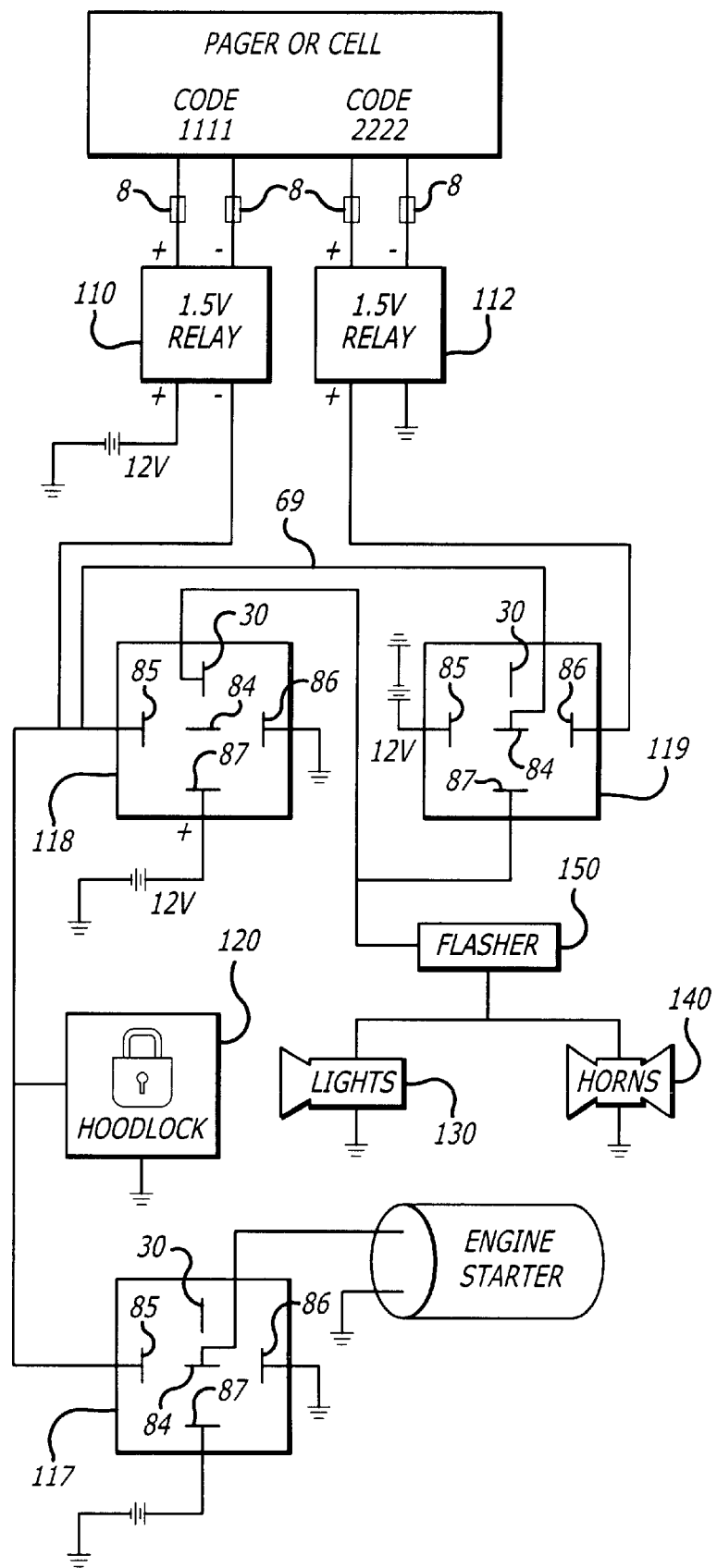
FIG. 1 a schematic of invention.
Figure 2:
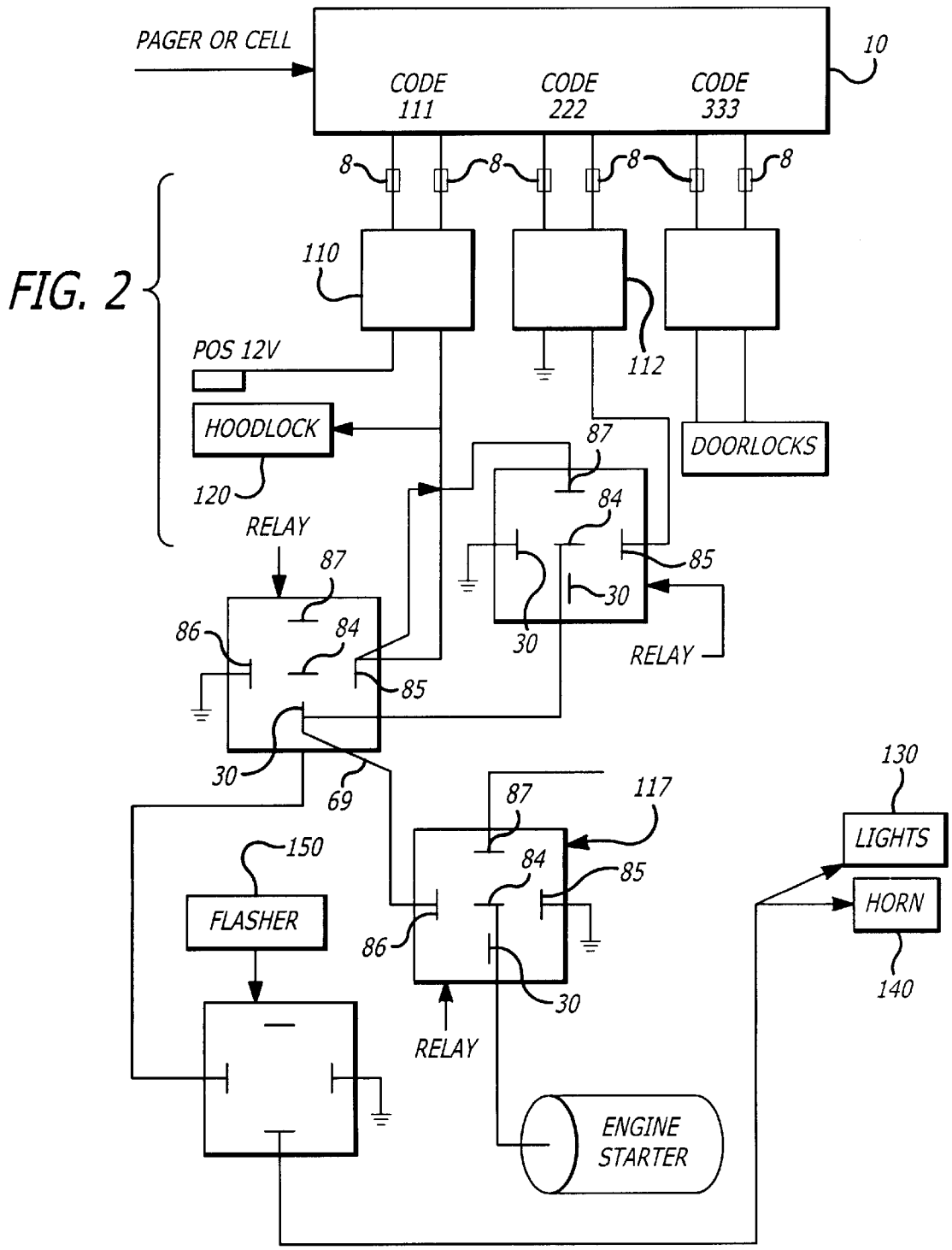
FIG. 2 is a detail schematic of invention.

When a car owner discovers that his car has been stolen, he can activate the Parker alarm system FIG. 1 by dialing a receiver embedded in the car. An embedded pager 10 or embedded cell phone can be located in the car and function as a receiver. A pager signal is preferred due to its wide availability in most parts of the world. An activation PIN code (such as 1111) can turn on the system. The pager 10 on the car requires a PIN code that allows activation of certain functions. When the alarm system is first activated, the pager usually operating at 1.5 V triggers a relay 110 to step up the activation voltage signal to the standard 12V operating voltage of the car. The activation voltage signal is sent first to the hood lock.

The system is comprised of a plurality of switches that can be implemented in a number of ways such as by software, through an integrated circuit, relays, or transistors. Two switches shown as 110, and 112 can be omitted if the pager 10 can be operated at 12V. They are only necessary to step up the voltage from the standard pager voltage of 1.5V to that of 12V.

A first relay 118 has posts 85, 86, 30 and 87 as well as a middle post 84. A 12V potential across post 85 to 86 allows current across 87 to 30. Otherwise, current is directed across the completed circuit between posts 87 and 84. The 12V activation voltage signal at relay 118 post 85 opens the path between relay 118 post 87 to 30. Relay 118 post 30 is routed to the flasher which intermittently activates the lights and horns. Relay 118 post 30 is also connected to the second relay 119, at post 87. The current travels from post 87 to 84 and reenters relay 118 post 85 to complete a feedback loop 69 that keeps the alarm on. As the flasher intermittently honks the horns, and flashes the lights, the alarm draws attention to the vehicle and allows police to locate and identify the stolen vehicle.

Theft Recovery

The present invention allows a thief to continue driving a car while the alarm is activated. Engine deactivation is effective to stop a car, but can be dangerous when the car is moving. Present vehicles have power steering and power braking that can fail if the engine is deactivated. A car without engine power can be dangerous especially when it is descending a steep hill.

Upon hearing the horn or alarm sound, some thieves will continue driving, and the horn and lights will help the police recover the vehicle. Other thieves will stop and abandon the car. More determined thieves will attempt to deactivate the alarm. In that case, a thief usually stops the car and turns off the engine. Then he can access the hood to physically disconnect the alarm or access the area under the dashboard and steering column. Should the thief turn off the car, he would be unable to restart the car because the engine starter has been deactivated. The third relay 117 accepts a voltage at post 85 and deactivates the engine starter. The second relay also activates a hood lock 120 to restrict access under the hood. A hood lock can be integrated into the OEM hood latching mechanism of the vehicle. The alarm is then activated which turns on the intermittent flasher 150.

Car thieves often try to disable car alarms by delivering a high voltage surge to the electrical system. The surge blows the secondary fuses while leaving the starter fuse intact. After the secondary fuses are blown, the thief can start the car with ease. A car usually contains a number of fuses. The electric starter mechanism of a car has a high surge capacity before it is disabled. Secondary fuses have a lower voltage requirement before they disable secondary systems such as: lights, audio system, alarm system, or power locks. A thief can remove the electrical panel underneath the steering column, find two wires and deliver a surge from a compact battery having the appropriate voltage transformer attached to jumper cables. The present invention includes diodes 8 that insulate the pager reception and alarm system from surges. The diodes 8 can also redirect the surge voltage.

An expensive car without a traditional alarm can raise the suspicions of a car thief. A cautious car thief may suspect a silent or latent alarm and attempt to deliver a prophylactic surge to the car's electrical system. The Parker system can be modified to detect a surge, trigger the engine ignition lock, and activate the alarm.

A car thief can also disable a car alarm by physically opening the hood and disconnecting certain parts of the car alarm or car battery. The hood lock prevents the disabling of the alarm in this manner.

After Recovery

After the owner has recovered the vehicle, the owner can dial the system with a code off such as 2222 to reactivate the vehicle's normal operations. Other codes can control other functions in the car. A code 3333 for example, can unlock the doors to aid in car recovery. There can be a plurality of codes. Also, a plurality of pagers can be used instead of a plurality of codes. The system can also be reduced to an integrated circuit, although relays are preferred for their resistance to surges.

The present invention uses a pager receiver in a car to actuate certain functions. The preferred embodiment has a pager sending a 1.5V signal to a 1.5V relay that actuate the second relay 119 to interrupt the feedback loop 69. This resumes normal operations of the car by deactivating the hood lock 120, engine starter disabling relay 117, and flasher 150. Because most car owners have cell phones, it is easy to activate and deactivate the vehicle. A car owner can activate and test the system even when the engine is not running.

What is claimed is:

1. A system for preventing vehicle theft including:
  a. an embedded receiver capable of receiving an alarm activation code and an alarm deactivation code from a touch tone phone, said alarm activation code and alarm deactivation code capable of activating a plurality of switches,
  b. a first switch activated by said alarm activation code, said first switch wired with a feedback loop to maintain power to a flasher capable of intermittently activating the lights and horns of a vehicle, said alarm activation code capable of activating a third switch to interrupt the engine starter, whereby said vehicle does not restart if the engine is turned off,
  c. a second switch to control current of said feedback loop of said first switch, said second switch capable of interrupting said current of said feedback loop of said first switch when said alarm deactivation code is received, whereby the flasher is deactivated, said alarm deactivation code capable of deactivating said third switch to allow engine starting.

2. The system of claim 1, wherein said embedded receiver is a pager.

3. The system of claim 1, further comprising a transmitter capable of sending a signal to notify the owner of vehicle ignition.

4. The system of claim 1, wherein said transmitter is capable of sending a page to notify the owner of vehicle ignition.

5. The system of claim 1, wherein said transmitter is capable of sending a short range radio signal to notify the owner of vehicle ignition.

6. The system of claim 1, wherein said embedded receiver is a cell phone that is also capable of dialing a plurality of phone numbers to notify the owner of vehicle ignition.

7. The system of claim 6, wherein said cell phone includes a digital camera capable of taking a photo of the driver and send said photo to owner's cell phone, whereby owner can see the person starting the vehicle.

8. The system of claim 7, wherein said digital photo is taken upon the ignition of the vehicle and sent to either the owner's cell phone or over the internet to the owner's computer.

* * * * *